Patented May 24, 1949

2,471,188

UNITED STATES PATENT OFFICE 2,471,188

UREA RESINS CONTAINING AMINOALKOXY SUBSTITUENTS

Robert W. Auten, Jenkintown, Pa., assignor to Rohm & Haas Company, Philadelphia, Pa., a corporation of Delaware No Drawing. Application July 28, 1945, Serial No. 607,651

5 Claims. (Cl. 260—70)

This invention relates to a new class of nitrogenous thermosetting resins and to the process by which they are prepared. The products of this invention are cationic nitrogenous hydrophilic resins having tertiary aminoalkoxy substituents. They are characterized by having unusually high solubility in water, even when very highly condensed, and are, therefore, particularly valuable in operations requiring very dilute solutions of resins as, for example, in the treatment of fabrics and the manufacture of paper products.

The resinous products of this invention are preferably made by a two-step process. In the first step, an alkylol derivative of a carbamide is prepared by the reaction of said carbamide with an aldehyde. When formaldehyde is employed, for instance, a methylol derivative is produced. In the second stage, the alkylol derivative so formed is reacted with a di-substituted amino alcohol, such as dimethylamino ethanol, and the product is further condensed by means of heat to a resinous condition. During the second step, a reaction takes place between the hydroxyl groups of the methylol intermediate and the alcohol with the formation of an ether linkage. Polymerization by condensation also takes place with the formation of a resin containing tertiary aminoalkoxy substituents.

Carbamides which may be used include urea, thiourea, guanidine, and monoacyl, monoalkyl, monoaryl, and monoaralkyl ureas. While urea is the preferred carbamide, it is to be understood that it may be replaced at least in part by other carbamides.

The operable carbamides have at least three aminohydrogen atoms available for reaction with the aldehyde and are commonly referred to as having a functionality greater than two.

Aldehydes which may be employed include formaldehyde, benzaldehyde, acetaldehyde, butyraldehyde, furfuraldehyde, and mixtures of two or more aldehydes, such as formaldehyde and acetaldehyde; formaldehyde and benzaldehyde; acetaldehyde and furfuraldehyde; formaldehyde, benzaldehyde and furfuraldehyde, and the like. When mixtures of formaldehyde and other aldehydes are used, particularly interesting resins result.

In the production of certain resins within the scope of this invention, formaldehyde is the aldehyde of first choice. While, in such cases, it is preferred that the formaldehyde be used in solution, as in formalin, it may also be used in its polymeric forms, e. g. paraformaldehyde, or at least in part in a form such as hexamethylene tetramine and formals which yield formaldehyde under the conditions of the reaction.

The amino-alcohols to be employed in the reaction may be substituted with a variety of groups. For example, if

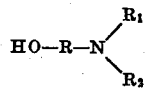

be considered the type formula for the amino-alcohol, R may be a saturated alkylene group containing two to six carbon atoms. As R increases in length from two carbons to six, the speed of reactivity of the alcohol with the methylol derivative decreases. Also, the solubility of the product in water tends to decrease with increase in the size of R. Substituted amino-ethanols are, therefore, the preferred class. Both $R_1$ and $R_2$ may be alkyl, aralkyl, or cycloalkyl groups. $R_2$ may also be an aryl group, in which case the other group, $R_1$, will be alkyl, aralkyl, or cycloalkyl. Thus, for example, the pair of substituent groups, $R_1$ and $R_2$, may be methyl and methyl; methyl and ethyl; ethyl and cyclohexyl; ethyl and phenyl; methyl and benzyl; cyclohexyl and cyclohexyl; cyclohexyl and phenyl; cyclohexyl and benzyl; phenyl and benzyl; benzyl and benzyl. N-diaryl-substituted amino-alcohols are inoperable and are, therefore, excluded. N-di-substituted amino-ethanols in which $R_1$ and $R_2$ are alkyl groups containing one to six carbons are preferred over all others due to the ease of reaction and the physical properties of the resultant products.

The ratio of the reactants may be varied widely, depending upon the type of product desired. Each reagent, as well as the amount thereof used, contributes to the properties of the final product. For example, the ratio of aldehyde to carbamide is of major importance. While two mols of aldehyde may react theroetically with each unsubstituted amino group, it is preferred to use much lower ratios in order to obtain resins which convert more rapidly to the infusible stage. Accordingly, the preferred ratio of aldehyde is about 1.0 to about 1.5 mols per amino group, or, in the case of urea-aldehyde resins, a ratio of two to three mols of aldehyde per mol of urea.

Of equally great importance is the proportion of the N-di-substituted amino-alcohol which is used in the reaction. Upon the ratio so used depends the number of N-di-substituted aminoalkoxy groups which are introduced into the resin molecule, and upon this number depend important properties of the resin. While it is theoretically possible to react as much as one molecule of amino-alcohol per methylol group, i. e., for each mol of reacted formaldehyde, it is preferred that a much lower ratio be used. The lower limit of the amount of amino-alcohol which may be used is 0.05 mol per mol of aldehyde, and the practical upper limit is 0.5 mol per mol of aldehyde. A preferred range which has proven to be eminently satisfactory is between 0.1 and 0.4 mol of amino-alcohol per mol of aldehyde. The amino-alcohol may be used as such or in the form of a salt.

In the preparation of the resinous products of this invention, the preferred method is that described above, wherein the aldehyde is first reacted with the carbamide to form an alkylol derivative which, in turn, is reacted under the influence of heat with a substituted amino-alcohol. In the latter step of the process, polymerization by condensation also occurs, and this reaction may be continued until the resin becomes extremely viscous and is ultimately converted to an infusible and relatively insoluble product.

Alternatively, the amino-alcohol and the aldehyde may be reacted together first and then mixed and reacted with the carbamide.

There are apparently two reactions which proceed simultaneously—one, the condensation of the resinous product which is accelerated by a lowering of the pH of the reaction mixture and which is manifested by an increase in viscosity, and the other, the reaction of the methylol intermediate and substituted amino-alcohol, resulting in the addition of substituted aminoalkoxy groups.

It is advisable to limit the temperature and pH of the reaction mixture so that the condensation and polymerization of the resin, which are favored by high temperature and low pH, do not proceed too rapidly to the exclusion of the etherification reaction.

The range of pH which assures satisfactory results is about 4 to about 7. Resins have been prepared at a pH as low as 3, but results are unsatisfactory due to the tendency of the condensation reaction to proceed too rapidly, resulting in the ultimate gelation of the resin. At a pH substantially above 7, the etherification reaction, as well as the condensation, tends to be sluggish.

Usually, at a given pH, the rate of condensation may be controlled by regulating the temperature. Preferably, temperatures above 60° C. are employed, and the upper limit is ordinarily the boiling point of the reaction mixture. This boiling point will depend upon the external pressure, the presence of dissolved salts, and similar factors. For the most part, it is convenient to operate at atmospheric pressure and at a temperature approximating 105° C., the point at which water is distilled from the reaction mixtures at normal atmospheric pressure.

The reaction may be carried to any desired end point, depending upon the intended use of the product. As the reaction continues, the viscosity of the reaction mixture progressively increases. For this reason, viscosity is a valuable index of the extent of reaction, and the resin is ordinarily condensed until a 50% solution of it in water has a viscosity above 0.5 poise at room temperature. A viscosity of about one to four poises is preferred, particularly when the resin is to be used for impregnating purposes.

The product may be used as a solution, or it may be concentrated or dried. Drying may be accomplished by conventional methods such as heating, with or without vacuum, drum-drying, or spray-drying. Since the product is thermosetting, care must be exercised, when a soluble product is desired, to conduct the drying so as to avoid converting the material to an infusible and insoluble condition. A properly dried resin is extremely stable and may be stored for a period of months without loss in solubility.

The following examples are for purposes of illustration:

Example 1

A mixture of 120 grams of urea (2.0 mols) and 373 grams of 37% aqueous formaldehyde (4.6 mols of HCHO) was simultaneously agitated and heated at 80° C. under reflux in a suitable container equipped with stirrer, thermometer, and reflux condenser. The aqueous formaldehyde had previously been brought to a pH of 7-8 by the addition of a 10% aqueous solution of sodium carbonate. The rate of heating was so regulated that the exothermic reaction resulting in the formation of dimethylolurea did not carry the temperature above 80° C. To the dimethylolurea thus formed was added 121.2 grams of dimethyl-amino-ethanol in the form of the hydrochloride salt. This amount corresponds to .21 mol of dimethylamino-ethanol per mol of formaldehyde. The mixture was adjusted to a pH of 5.4 with formic acid and was then refluxed for fourteen hours, after which water was distilled off until the solution had a solids content of 50%. In this condition, the solution was a clear, straw-colored liquid and had a viscosity at 25° C. of N on the Gardner-Holdt scale.

The product of this example had unusually high solubility in water and could be indefinitely diluted at 25° C. without precipitation. A solution of 10% resin in water did not show any turbidity when cooled to 11° C. In contrast, a urea-formaldehyde resin of the same formaldehyde content, prepared at the same pH and temperature and having a viscosity of K, would tolerate only about two grams of water per gram of resin at 25° C. without becoming turbid, and a 10% solution thereof was clear only above 37° C.

Example 2

Sheets of paper were made from kraft pulp by following the procedure of T. A. P. P. I. specification T-205-M-36. These served as standards or blanks. Other sheets were made in an identical manner except that the resin of Example 1 was added to the pulp in the beater to the extent of 3% resin solids on the weight of the dry pulp. Finally, for comparative purposes, sheets were made in the same way except that 6% urea-formaldehyde resin solids, based on the dry pulp, was added to the beater. Below is a comparison of the tensile strength of the three kinds of sheets when measured dry and wet on a Scott IP-4 testing machine and corrected to a forty-five pound per ream basis:

|  | Dry Tensile | Wet Tensile | Wet Tensile As Per Cent of Dry |
|---|---|---|---|
| Paper free of resin | 15.7 | 1.5 | Per cent 10 |
| Paper treated with 6% urea resin | 17.5 | 2.8 | 16 |
| Paper treated with 3% resin of Example 1 | 20.9 | 5.8 | 28 |

The advantage of the resin of this invention over the urea-formaldehyde resin is apparent.

The products of this invention have distinctive properties and a wide variety of uses. They are thermosetting and can be converted to the infusible stage by means of heat or by the catalytic action of acidic agents. Of outstanding importance is the fact that such products are soluble in all proportions in water and have varying solubilities in many hydroxylated solvents. This high degree of solubility is retained even when the resins are unusually highly condensed. As the example above indicates, the products of this invention at a given degree of condensation have much greater solubility in, and tolerance for, water than do the usual urea-formaldehyde resins of approximately the same degree of condensation. Conversely, at the same degree of solubility, the products of this invention may be much more highly condensed than the usual urea-formaldehyde resins. Furthermore, solutions of the products of this invention are far more stable than corresponding solutions of the usual urea-formaldehyde resins. This is of real importance and value. For example, two chief disadvantages of using solutions of urea-formaldehyde resins in the past have been (a) the tendency of the resin to precipitate when the solution is diluted and (b) the tendency of the resin in solution to increase rapidly in viscosity, even at room temperature, to the point where the entire solution gels to an unusable condition. This lack of stability is reflected in the custom of dating commercial shipments of solutions of such resins and combining a warning that the resin should be used within a certain period, say three months, and/or that the solution be stored in a cool place.

Both of these disadvantages are overcome when products as herein described are employed. The products which comprise this invention have excellent stability and exceptional water tolerance. As a result, they accomplish valuable results formerly unattainable with the usual urea-formaldehyde resins. Thus, the new products are particularly well suited for impregnating fibrous materials such as paper, cloth, wood, and the like.

The products of this invention are particularly valuable in the preparation of special kinds of paper, such as paper of high wet strength, as was shown above. In this operation, full advantage may be taken of the unusual physical and chemical properties of the resins. Thus, their extreme solubility permits their use at the wet end of the paper machine in the beater, head box, or machine chest where the resins remain in solution even in the extremely dilute aqueous mixtures used in paper making. Furthermore, the resin molecules acquire a positive charge in the acidic pulp mixture and, as a result, are sorbed to a much greater extent than the usual urea-formaldehyde resins by the negatively charged cellulose. A typical positively charged resin is believed to have the following configuration:

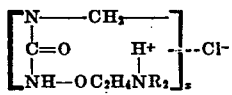

Furthermore, the very highly condensed resins, which are still extremely soluble, may be used; and there is evidence that highly condensed resins are more completely adsorbed by the pulp.

The resins described herein have anion adsorbing properties. For this purpose, they are ordinarily converted to infusible spongelike masses by means of heat and/or acid agents. While their water resistance is too low to permit their repeated use and regeneration in ion-exchange columns, they can be used in the many applications where repeated regeneration is not required.

The products of this invention may further be used as casting and laminating resins and in conjunction with plasticizers, pigments, inert extenders, fillers, starch, cereal flours, and wood flours.

I claim:

1. As a new composition of matter, a thermosetting resinous product, containing di-substituted aminoalkoxy groups, obtained by condensing at a pH of 4 to 7 (a) urea, and (b) an aldehyde from the group consisting of formaldehyde, acetaldehyde, butyraldehyde, furfuraldehyde, and benzaldehyde, to form an alkylol derivative of said urea, and etherifying said alkylol derivative with (c) a di-substituted amino-alcohol having the general formula

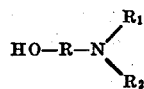

in which R is a saturated alkylene group of two to six carbon atoms, $R_1$ is a hydrocarbon group from the class consisting of alkyl groups of one to six carbon atoms, benzyl, phenyl and cyclohexyl groups, and $R_2$ is a hydrocarbon group from the class consisting of alkyl groups of one to six carbon atoms, benzyl and cyclohexyl groups, at a temperature from 60° C. to 105° C., the aldehyde being reacted in an amount from 2 to 3.0 mols per mol of urea and the amino-alcohol being reacted in an amount from 0.05 to 0.5 mol per mol of aldehyde.

2. As a new composition of matter, a thermosetting resinous product, containing di-substituted amino-alkoxy groups, obtained by condensing at a pH of 4 to 7 (a) urea, and (b) an aldehyde from the group consisting of formaldehyde, acetaldehyde, butyraldehyde, furfuraldehyde, and benzaldehyde, to form an alkylol derivative of said urea, and etherifying said alkylol derivative with (c) a di-substituted amino-alcohol having the general formula

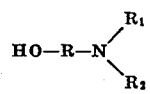

in which R is a saturated alkylene group of two to six carbon atoms, $R_1$ is a hydrocarbon group from the class consisting of alkyl groups of one to six carbon atoms, benzyl, phenyl and cyclohexyl groups, and $R_2$ is a hydrocarbon group from the class consisting of alkyl groups of one to six carbon atoms, benzyl and cyclohexyl groups, at a temperature from 60° C. to 105° C., the aldehyde being reacted in an amount from 2 to 3.0 mols per mol of urea and the amino-alcohol being reacted in an amount from 0.1 to 0.4 mol per mol of aldehyde.

3. As a new composition of matter, a thermosetting resinous product, containing di-substituted aminoalkoxy groups, obtained by condensing at a pH of 4 to 7 urea and formaldehyde to form a methylol derivative of urea and etherifying said derivative with a di-substituted amino-alcohol having the general formula

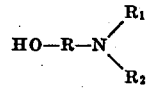

in which R is a saturated alkylene group of two to six carbon atoms, $R_1$ is a hydrocarbon group from the class consisting of alkyl groups of one to six carbon atoms, benzyl, phenyl and cyclohexyl groups, and R₂ is a hydrocarbon group from the class consisting of alkyl groups of one to six carbon atoms, benzyl and cyclohexyl groups, at a temperature from 60° C. to 105° C., the formaldehyde being reacted in an amount from two to three mols per mol of urea and said aminoalcohol being reacted in an amount from 0.1 to 0.4 mol per mol of formaldehyde.

4. As a new composition of matter, a thermosetting resinous product, containing di-substituted aminoalkoxy groups, obtained by reacting at a pH of 4 to 7 urea and formaldehyde to form a methylol derivative of urea and etherifying said derivative with dimethylamino ethanol at a temperature from 60° C. to 105° C., the formaldehyde being reacted in an amount from two to three mols per mol of urea and said dimethylamino ethanol being reacted in an amount from 0.1 to 0.4 mol per mol of formaldehyde.

5. As a new composition of matter, a thermosetting resinous product, containing di-substituted aminoalkoxy groups, obtained by reacting at a pH of 4 to 7 urea and formaldehyde to form a methylol derivative of urea and etherifying said derivative with diethylamino ethanol at a temperature from 60° C. to 105° C., the formaldehyde being reacted in an amount from 2 to 3 mols per mol of urea and said diethylamino ethanol being reacted in an amount from 0.1 to 0.4 mol per mol of formaldehyde.

ROBERT W. AUTEN.

REFERENCES CITED

The following references are of record in the file of this patent:

FOREIGN PATENTS

| Number | Country | Date |
| --- | --- | --- |
| 543,092 | Great Britain | Feb. 10, 1942 |